US009696807B2

(12) United States Patent
Fleizach et al.

(10) Patent No.: US 9,696,807 B2
(45) Date of Patent: Jul. 4, 2017

(54) CUSTOM VIBRATION PATTERNS

(71) Applicant: Apple Inc., Cupertino, CA (US)

(72) Inventors: Christopher B. Fleizach, Morgan Hill, CA (US); Eric Taylor Seymour, San Jose, CA (US); Joel M. Lopes Da Silva, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/198,194

(22) Filed: Jun. 30, 2016

(65) Prior Publication Data

US 2016/0306428 A1 Oct. 20, 2016

Related U.S. Application Data

(63) Continuation of application No. 13/153,331, filed on Jun. 3, 2011, now Pat. No. 9,383,820.

(51) Int. Cl.
*G08B 6/00* (2006.01)
*G06F 3/01* (2006.01)
(Continued)

(52) U.S. Cl.
CPC ............ *G06F 3/016* (2013.01); *G06F 3/0488* (2013.01); *H04M 1/72519* (2013.01); *H04M 19/047* (2013.01); *H04M 2250/22* (2013.01)

(58) Field of Classification Search
CPC .. B64F 1/22; B64F 1/227; G06F 3/016; G06F 3/0488; H04M 19/047; H04M 1/72519; H04M 2250/22; Y02T 50/826
(Continued)

(56) References Cited

U.S. PATENT DOCUMENTS 7,801,569 B1   9/2010   Zellner
8,390,584 B1   3/2013   Bhojan
(Continued)

FOREIGN PATENT DOCUMENTS

CN   101184289   5/2008
EP   1 812 892   8/2007
(Continued)

OTHER PUBLICATIONS

A-Droid, Support VibraSeq pattern in your app!, URL : http://me-a-droid.blogspot.jp/, Apr. 28, 2010, 4 pages.
(Continued)

*Primary Examiner* — Ojiako Nwugo
(74) *Attorney, Agent, or Firm* — Fish & Richardson P.C.

(57) ABSTRACT

The present disclosure describes technology, which can be implemented as a method, apparatus, and/or computer software embodied in a computer-readable medium, and which, among other things, be used to create custom feedback patterns in response to user input, for example, in response to the user inputting a desired pattern of tactile events detected on a mobile device. For example, one or more aspects of the subject matter described in this disclosure can be embodied in one or more methods that include receiving tactile input from a user of an electronic device specifying a custom feedback pattern, in concert with receiving tactile input, providing feedback to the user corresponding to the received tactile input, and storing the specified custom feedback pattern for use by the electronic device to actuate feedback signaling a predetermined notification event.

18 Claims, 7 Drawing Sheets

(51) Int. Cl.
  *G06F 3/0488* (2013.01)
  *H04M 1/725* (2006.01)
  *H04M 19/04* (2006.01)

(58) Field of Classification Search
  USPC ............ 340/407.1, 407.2; 345/156, 173, 174
  See application file for complete search history.

(56) References Cited

U.S. PATENT DOCUMENTS

| | | |
|---|---|---|
| 2004/0058718 A1 | 3/2004 | Yu |
| 2004/0203631 A1 | 10/2004 | Wong et al. |
| 2007/0001814 A1 | 1/2007 | Steinke et al. |
| 2007/0133770 A1 | 6/2007 | LaPierre et al. |
| 2007/0176742 A1 | 8/2007 | Hofmann et al. |
| 2008/0204427 A1 | 8/2008 | Heesemans et al. |
| 2008/0297475 A1 | 12/2008 | Woolf et al. |
| 2009/0215432 A1 | 8/2009 | Matsuoka |
| 2009/0322695 A1 | 12/2009 | Cho et al. |
| 2009/0325647 A1 | 12/2009 | Cho |
| 2010/0001849 A1 | 1/2010 | Lee et al. |
| 2010/0004033 A1 | 1/2010 | Choe et al. |
| 2010/0044121 A1 | 2/2010 | Simon et al. |
| 2010/0164894 A1* | 7/2010 | Kim ................... G06F 3/016 345/173 |
| 2010/0261509 A1* | 10/2010 | Kovvali ............ H04M 1/72522 455/567 |
| 2010/0288108 A1 | 11/2010 | Jung et al. |
| 2010/0302003 A1 | 12/2010 | Zellner |
| 2011/0025611 A1 | 2/2011 | Yoo et al. |
| 2011/0053577 A1* | 3/2011 | Lee ................... H04M 1/72552 455/418 |
| 2012/0005577 A1 | 1/2012 | Chakra |

FOREIGN PATENT DOCUMENTS

| | | |
|---|---|---|
| EP | 2 251 857 | 11/2010 |
| JP | H10-257135 | 9/1998 |
| JP | H11-004282 | 1/1999 |
| JP | H11-187087 | 7/1999 |
| JP | 2002-176679 | 6/2002 |
| JP | 2002-281117 | 9/2002 |
| JP | 2003-008687 | 1/2003 |
| JP | 2007-013837 | 1/2007 |
| JP | 2007-215051 | 8/2007 |
| JP | 2008-508629 | 3/2008 |
| JP | 2009-508446 | 2/2009 |
| JP | 2010-528394 | 8/2010 |
| JP | 2011-520322 | 7/2011 |
| JP | 2013-503578 | 1/2013 |
| KR | 10-2007-0039113 | 4/2007 |
| KR | 10-2010-0003522 | 1/2010 |
| KR | 10-2010-0078294 | 7/2010 |
| WO | WO 2010/107661 | 9/2010 |

OTHER PUBLICATIONS

Australia Innovation Patent Examination Report No. 1 for Application No. 2013100557 dated May 17, 2013, 4 pages.
PCT Notification of Transmittal of the International Search Report and the Written Opinion for Application No. PCT/US2012/040484 dated Sep. 21, 2012, 20 pages.
U.S. Non-Final Office Action for U.S. Appl. No. 13/153,331 dated Jul. 18, 2013, 21 pages.
Australia Innovation Patent Examination Report No. 2 for Application No. 2013100557 dated Oct. 11, 2013, 3 pages.
PCT International Preliminary Report on Patentability for Application No. PCT/US2012/040484 dated Dec. 4, 2013, 13 pages.
European Office Action in Application No. 12726559.3, dated Nov. 11, 2014, 9 pages.
Australia Innovation Patent Examination Report No. 1 for Application No. 2013100557 dated Dec. 22, 2014, 4 pages.
U.S. Final Office Action for U.S. Appl. No. 13/153,331 dated Feb. 24, 2015, 19 pages.
Korean Office Action in Application No. 10-2013-7034525, dated Jan. 21, 2015, 8 pages.
Australia Patent Examination Report No. 2 for Application No. 2013100557 dated Apr. 8, 2015, 4 pages.
European Communication for Application No. 12726559.3, dated Apr. 21, 2015, 8 pages.
Office Action in CN Application No. 201280027138.X, dated Oct. 19, 2015, 13 pages.
Summons to Attend Oral Proceedings in EP Application No. 12726559.3, dated Jan. 7, 2016, 11 pages.
Australia Innovation Patent Examination Report No. 3 for Application No. 2013100557 dated Jan. 29, 2016, 3 pages.
U.S. Non-Final Office Action for U.S. Appl. No. 13/153,331 dated Jun. 10, 2014, 13 pages.
U.S. Final Office Action for U.S. Appl. No. 13/153,331 dated Feb. 21, 2014, 25 pages.
U.S. Non-Final Office Action for U.S. Appl. No. 13/153,331 dated Sep. 17, 2015, 17 pages.
U.S. Notice of Allowance for U.S. Appl. No. 13/153,331 dated Mar. 11, 2016, 8 pages.
European Extended Search Report for Application No. 17153739.2, dated Apr. 4, 2017, 10 pages.

* cited by examiner

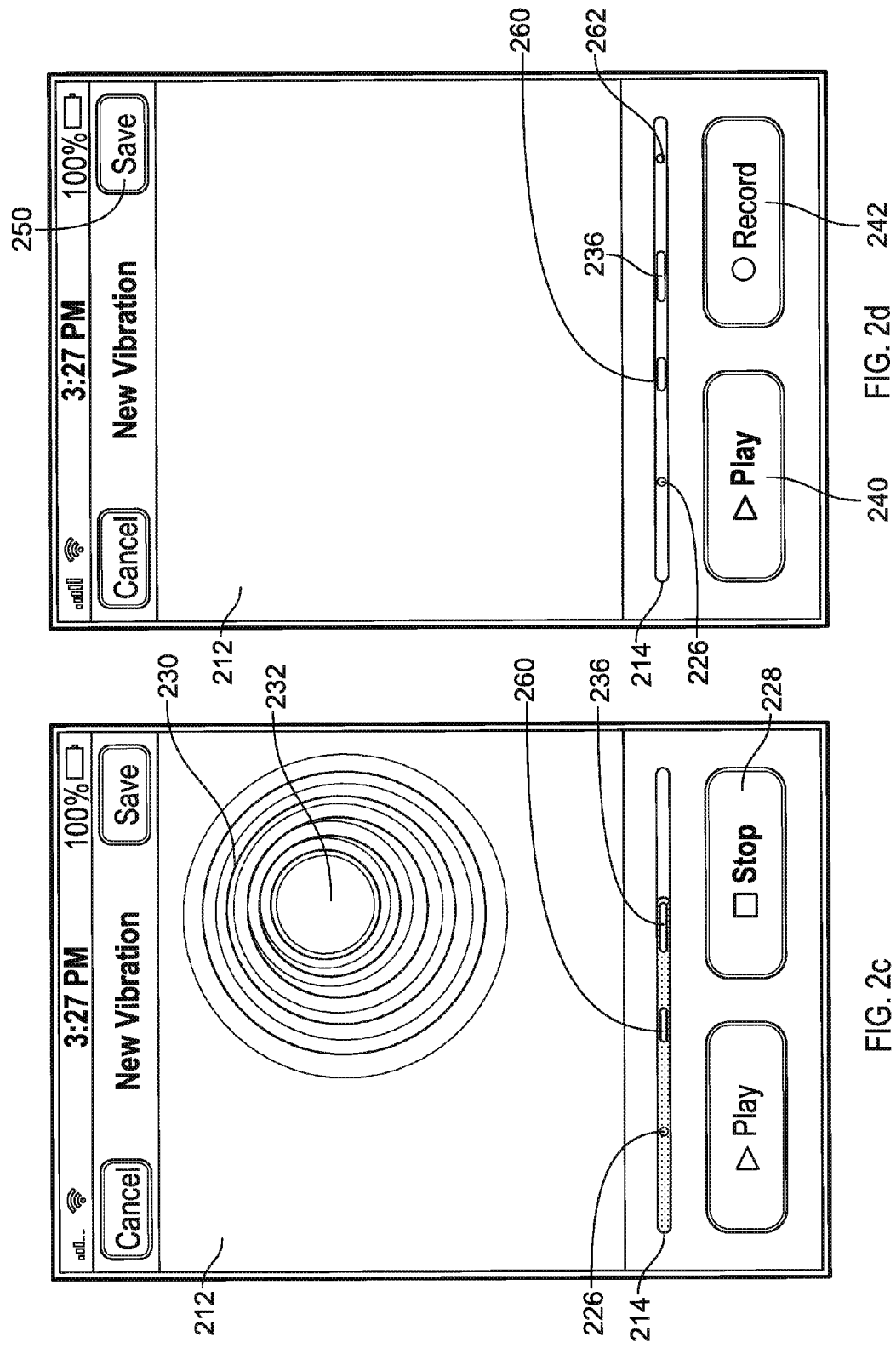

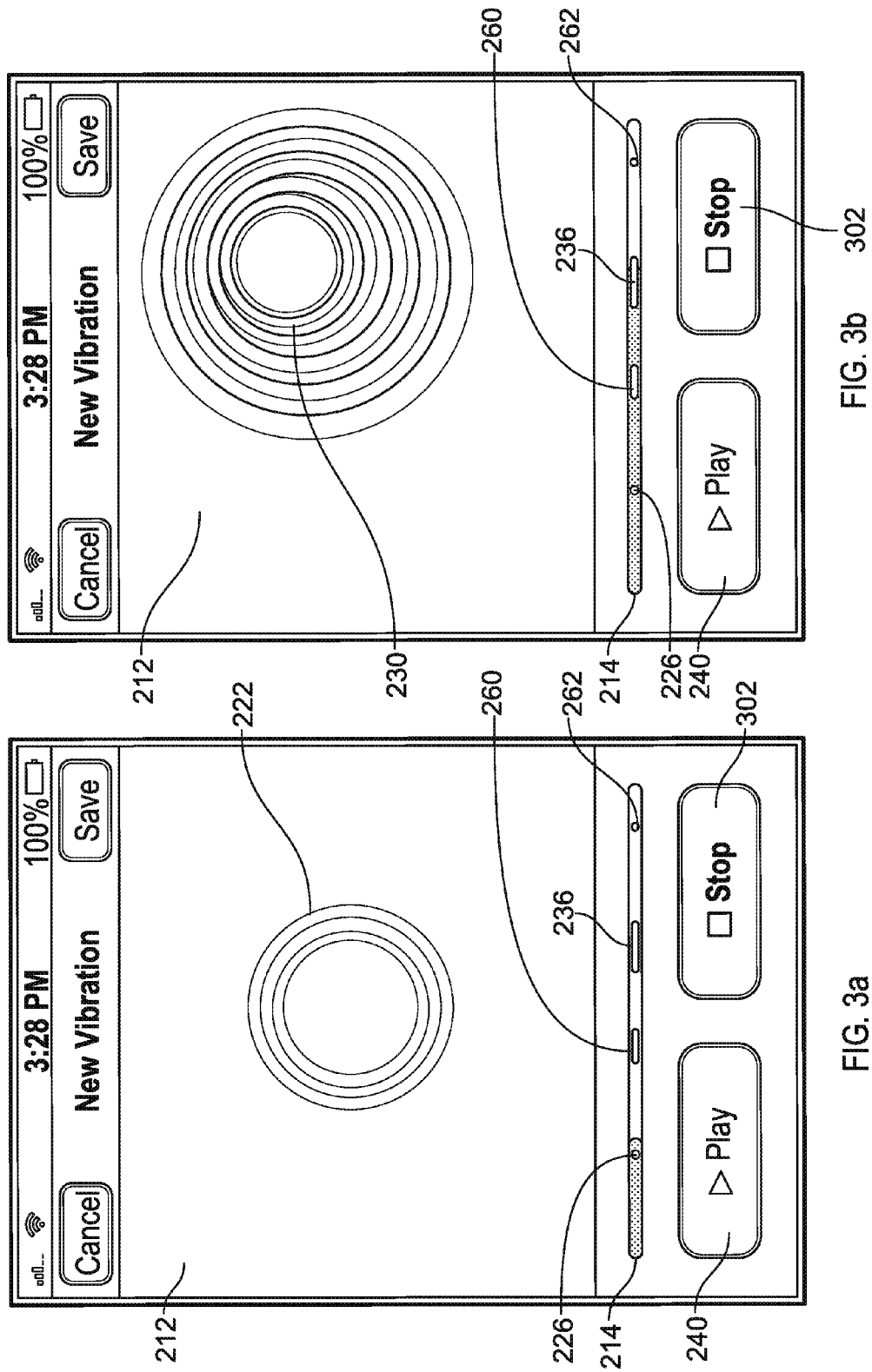

CUSTOM VIBRATION PATTERNS

CROSS-REFERENCE TO RELATED APPLICATION

This application is a continuation (and claims the benefit of priority under 35 USC 120) of U.S. application Ser. No. 13/153,331, filed Jun. 3, 2011, now allowed, which is incorporated by reference in its entirety.

TECHNICAL FIELD

This disclosure relates generally to creating custom vibration patterns for playback by a mobile electronic device, for example, in response to receiving a notification event.

BACKGROUND

Mobile devices are currently capable of providing unique audible indications in response to receiving notifications or alerts at the mobile device, for example, the receipt of a phone call, email message, or text message. For example, a user of a mobile device may assign unique ringtones to associated contacts in the user's contact address book. When the mobile device detects that one of these unique contacts is calling, or otherwise attempting to communicate with, the user, the mobile device can provide audible playback of the unique ringtone assigned to the calling contact.

In addition, a user of a mobile device can assign unique sounds to essentially any notification event associated with a mobile device. For example, phone calls, SMS/MMS messages, email receipt, calendar alerts, and the like may be assigned to corresponding sounds that can audibly inform the user of the underlying notification event or alert.

SUMMARY

This disclosure describes technology, which can be implemented as a method, apparatus, and/or computer software embodied in a computer-readable medium, and which, among other things, be used to create custom vibration patterns in response to user input, for example, in response to the user tapping out a desired pattern on the display of a mobile device.

In general, in one aspect, a method performed by one or more processes executing on a computer system includes receiving tactile input from a user of an electronic device specifying a custom vibration pattern, in concert with receiving tactile input, providing visual feedback to the user corresponding to the received tactile input, and storing the specified custom vibration pattern for use by the electronic device to actuate haptic feedback signaling a predetermined notification event. Other implementations of this aspect include corresponding systems, apparatus, and computer program products.

This, and other aspects, can include one or more of the following features. The tactile input may comprise a cadence of tap-down and tap-up events received on a touch-sensitive surface of the electronic device. The visual feedback may comprise a progress bar illustrating the custom vibration pattern over time. The progress bar may include an indication of vibration segments within the custom vibration pattern, the vibration segments corresponding to tap-down events. The indication of each vibration segment in the progress bar may include a length, wherein the length of each vibration segment corresponds to a duration of a tap-down event. The visual feedback may visually accentuate an origin of a tap-down event. The visual feedback may vary in relation to at least one of intensity and duration of the tap-down event. The visual feedback may be noticeably lesser regarding at least one of color intensity, size, and speed for a shorter duration tap-down event as compared to a longer duration tap-down event. The method can further include, in concert with receiving the tactile input, providing haptic feedback to the user corresponding to the received tactile input specifying the custom vibration pattern. The haptic feedback may vary in relation to at least one of intensity and duration of a tap-down event. The haptic feedback may be noticeably lesser regarding at least one of duration and intensity for a shorter duration tap-down event as compared to a longer duration tap-down event. The method may further include replaying the custom vibration pattern, where the replaying further includes providing the visual feedback to the user corresponding to the tactile input and actuating haptic feedback corresponding to the custom vibration pattern. The method may further include assigning the custom vibration pattern to a notification event and upon detection of the notification event by the electronic device, actuating haptic feedback in accordance with custom vibration pattern.

Potential advantages that may arise from the described subject matter may include enhanced visualization feedback during the recording and replay phases of a custom vibration pattern. For example, while recording a custom vibration pattern, a user may tap out a pattern on the display of a mobile device. Upon detecting a tap-down event, the mobile device can provide visualizations in the display corresponding to the tap-down event. For example, a progress bar may be displayed that contains indications of the length of a tap-down event and/or periods between tap-down events. In addition, other visual feedback may be provided simultaneously in another portion of the display. For example, a pebble-in-pond ripple effect may be displayed in which ripples visually appear on the display screen to be emanating from the origin of the tap-down event. The ripple effect may vary in intensity and color corresponding to the force and duration of the tap-down event.

Another potential advantage may include a method for vibrating a mobile device in a customized way so as to provide recognizable vibration feedback for a notification event or alert. For example, a unique vibration pattern can be assigned to a particular contact in an address book, a SMS/MMS notification, a calendar alert, email receipt, and the like. Upon detecting a notification event or alert, if the notification event or alert is assigned to a vibration pattern, the mobile device can actuate haptic feedback corresponding to the vibration pattern to inform a user of the mobile device of the underlying notification event or alert.

Details of one or more implementations are set forth in the accompanying drawings and the description below. Other features, aspects, and potential advantages will be apparent from the description and drawings, and from the claims.

DESCRIPTION OF DRAWINGS

FIGS. 2*a*-2*d* are exemplary user interfaces for creating custom vibration patterns on a mobile device.

FIGS. 3*a*-3*b* are exemplary user interfaces for replaying custom vibration patterns on a mobile device.

Like reference symbols in the various drawings indicate like elements.

DETAILED DESCRIPTION

Figure 1:
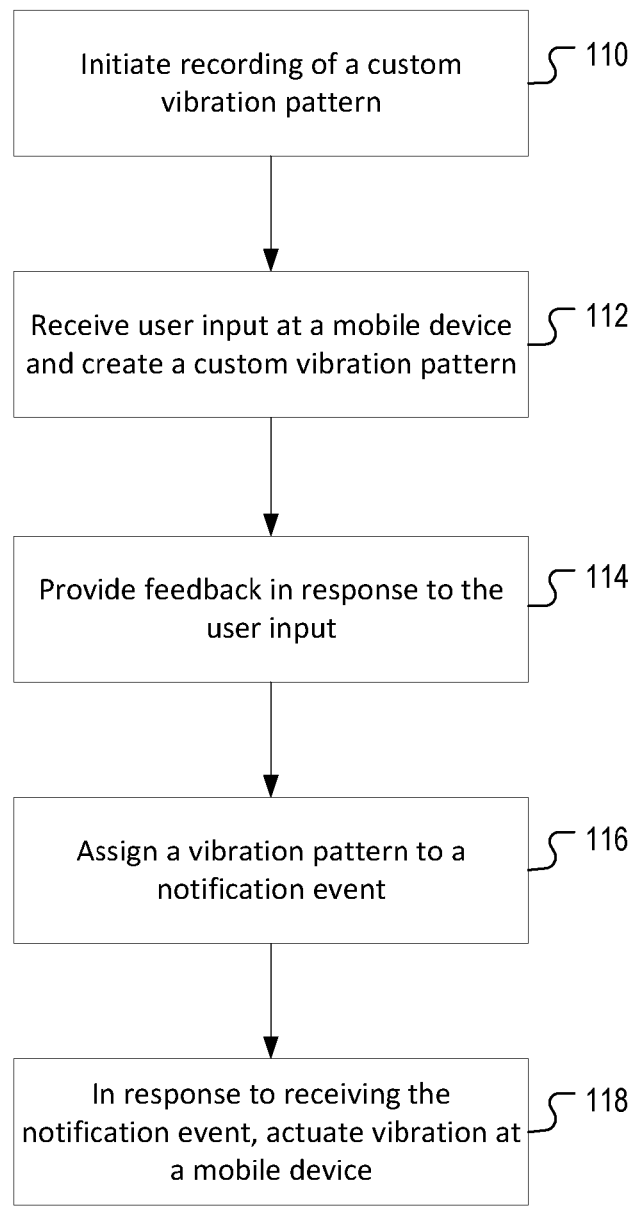
FIG. 1 is a flowchart of an example method for creating a custom vibration pattern for a notification event.

FIG. 1 is a flowchart of an example method for creating a custom vibration pattern and assigning the custom vibration pattern to a notification event. In step 110, a user of a mobile device may initiate recording of a custom vibration pattern. For example, the user may select a record button in the user interface of an application for creating a custom vibration pattern. Upon initiation of the record phase, the mobile device can detect and capture input received from the user and create a custom vibration pattern in response to the input. In step 112, user input can be received at the mobile device. For example, a user may physically tap out a cadence (e.g., a series of tap-down events of varying duration and potentially having varying delays between them) on a touch-sensitive surface associated with the mobile device. Input may also be received from any other suitable input mechanism, e.g., a motion capture sensor or a physical button on the mobile device. For each tap-down event, a particular vibration segment within a vibration pattern can be created. In some implementations, the duration of a vibration segment may be related to a respective duration of a tap-down event. Additionally, the duration of a tap-up event, e.g., an arbitrarily long duration during which no tap-down events are detected, may be related to a respective duration between tap-down events. For example, if a mobile device detects a one second tap-down event (e.g., the user's finger or stylus remains in contact with the touch sensitive surface) followed by two seconds of a tap-up event followed by three seconds of a second tap-down event, the vibration pattern can be one second of vibration followed by two seconds of no vibration followed by three seconds of vibration.

A measure of intensity (e.g., a detected force with which the user asserted a finger or stylus against the touch sensitive surface) may be detected with each tap-down event and translated into variable intensity (e.g., varying levels of vibration) for a corresponding vibration segment in the vibration pattern. In some implementations, intensity of a vibration segment may be variable based on the duration of a tap-down event. For example, at the start of a tap-down event, a vibration segment may be associated with a particular intensity. As the duration of the tap-down event increases, the intensity associated with the vibration segment may increase or decrease as a function of the duration of the tap-down event, e.g., proportionally to the duration of the tap-down event or inversely to the duration of the tap down event. In some implementations, the intensity associated with a vibration segment may reach a maximum intensity based on the capabilities of the haptic mechanisms in a mobile device.

In another implementation, intensity may be determined based on an amount of force applied to a touch-sensitive surface or the location on a touch-sensitive surface of a tap-down event. For example, varying forces (e.g., a finger or stylus applying different amounts of force) can be detected on a touch-sensitive surface during a single tap-down event. Such varying forces can be translated to varying vibrations in the vibration segment corresponding to the tap-down event. Additionally, specific regions of a touch-sensitive surface may be associated with varying levels of intensity such that when a tap-down event occurs in a specific region, a specific intensity is assigned to the corresponding vibration segment. For example, a tap-down event sensed in one specific region of the touch sensitive surface, for example, the center, may correspond to a higher intensity vibration whereas a tap-down sensed in another specific region of the touch sensitive surface, for example, a corner, may correspond to a lower intensity vibration. In some implementations, intensity may be determined based on a particular tap-down and drag pattern across a touch-sensitive surface. For example, a tap-down event may start in one portion of a touch-sensitive surface and end in another. An intensity may be assigned to a corresponding vibration segment based on the direction of travel for the tap-down event. For example, a tap-down event that starts near the bottom and ends near the top of the touch sensitive surface may correspond to a high, or increasing, intensity, while a tap-down event detected moving in the opposite direction may correspond to a low, or decreasing, intensity. Tap-down events moving left-to-right, right-to-left, or diagonally similarly may correspond to predetermined intensity levels and/or patterns of varying intensities.

User input received in step 112 may also be detected by a motion sensing component of a mobile device. For example, a user can make a physical gesture with the mobile device (e.g., accelerate the device in a direction such as up, down, left, or right) which can be translated into a corresponding vibration segment in a vibration pattern.

In step 114, feedback may be provided in response to the user input received in step 112. Feedback may be provided visually, tactilely, audibly, or through any other suitable means for providing feedback. In some implementations, the duration of a tap-down event may correspond to the duration of a particular vibration segment in a vibration pattern. Visual feedback may be provided depicting the duration of the vibration segment based on the duration of the tap-down event. For example, a progress bar may be displayed that indicates the duration of a vibration pattern over time and the duration of the vibration segments within the vibration pattern over time. In some implementations, a shorter duration tap-down event, e.g., a tap-down without a tap-down hold, may be represented by a dot whereas a longer duration tap-down event, e.g., a tap-down with a tap-down hold, may be represented by a growing rectangle of variable length in the progress bar.

Other visual feedback may be provided on the display of a mobile device in step 114 in response to receiving user input to create a vibration pattern, e.g., a "pebble-in-pond" effect such as shown in FIG. 4*b*. In some implementations, a pebble-in-pond effect can be visualized as a rippling wave or waves emanating from the origin on the touch-sensitive surface where a tap-down event was detected, similar to waves emanating from the origin of a pebble entering a pond. If the tap-down event is shorter in duration or has weaker intensity, the ripples emanating from the tap-down event can appear to be smaller as if a small pebble were thrown into a pond. On the other hand, if the tap-down event is longer in duration or has a stronger intensity, the ripples emanating from the origin of the tap-down event can appear to be larger as if a large pebble were thrown into a pond. Additionally, fewer ripples may be used for a shorter tap-down event and a greater number of ripples may be used for a longer tap-down event. In some implementations, color may be associated with the ripples such that certain colors are associated with varying intensities of a tap-down event.

For example, a shorter duration or weaker in intensity tap-down event may result in green ripples whereas a longer duration or stronger intensity tap-down event may result in red ripples.

Other visual feedback may be provided on the display of a mobile device in step 114 in response to receiving user input to create a vibration pattern, e.g., a circle emanating from the origin of a tap-down event that grows and shrinks based on the duration and/or intensity of the tap-down event. In some implementations, a circle can expand indefinitely from the origin of the tap-down event as a solid circle until a threshold circular size is reached, at which point the circle may start pulsating to provide the visualization that the circle has reached a maximum bound and continues to bump up against that maximum bound. Upon release of the tap-down event, i.e., a tap-up event, the circle can begin to shrink. Additionally, colors may be associated with the circle to indicate intensity for a vibration segment in a vibration pattern. For example, a circle could start emanating from the origin of the tap-down event in one color, e.g., green, indicating that the vibration segment may have a low intensity. The circle may then transition to a different color, e.g., red, as the circle expands to indicate that the vibration segment may have a stronger intensity.

In addition, in step 114 haptic feedback may be provided during the recording phase of a vibration pattern. For example, during a tap-down event, a mobile device can provide haptic feedback, or vibrations, corresponding to the tap-down event. The haptic feedback may vary in intensity and duration depending on the detected duration and intensity of the tap-down event. In some implementations, the haptic feedback tracks or relates to the vibration segments in the custom vibration pattern being created by the user input. For example, the haptic feedback provided in step 114 in response to the user input received in step 112 may correspond to vibration in the vibration pattern. That is, the haptic feedback provided in step 114 may be the same haptic feedback or vibrations actuated in step 118 to notify a user of a mobile device that a notification event has been received, where the vibration pattern corresponding to the haptic feedback has been assigned to the notification event in step 116.

Feedback provided in step 114 in response to receiving user input may be provided in a real-time manner. For example, although the mobile device may not know how long a tap-down event will last, visualization and haptic feedback can be provided in real-time for an indefinite amount of time by providing instructions to the mobile device to start and stop the feedback based on the received user input.

In step 114, in addition to providing real-time feedback during the recording phase of a vibration pattern, visual and haptic feedback can be provided during a replay portion of the recording phase. For example, after recording has ended, a user of the mobile device may desire to preview the vibration pattern before assigning it to a notification event. In some implementations, the user can select to replay the vibration pattern just recorded. During replay, any of the visualizations discussed in this disclosure can be displayed and haptic feedback can be provided corresponding to the recorded vibration pattern.

In step 116, the custom vibration pattern created in step 112 can be assigned to a notification event. For example, the custom vibration pattern may be assigned to a particular contact in an address book, universally for all phone calls, SMS/MMS messages, email receipts, calendar alerts, and the like. In step 118, upon detection of a notification event by a mobile device, e.g., a call from a contact with an assigned vibration pattern, the mobile device can actuate haptic feedback at the mobile device corresponding to the vibration pattern.

In addition to or in place of assigning a custom vibration pattern to a notification event, preset or stock vibration patterns may be assigned to a notification event in step 116. For example, a number of preset and stock vibration patterns may be provided to a mobile device. A user of the mobile device may assign any of such preset or stock vibration patterns to a notification event.

Figure 2B:
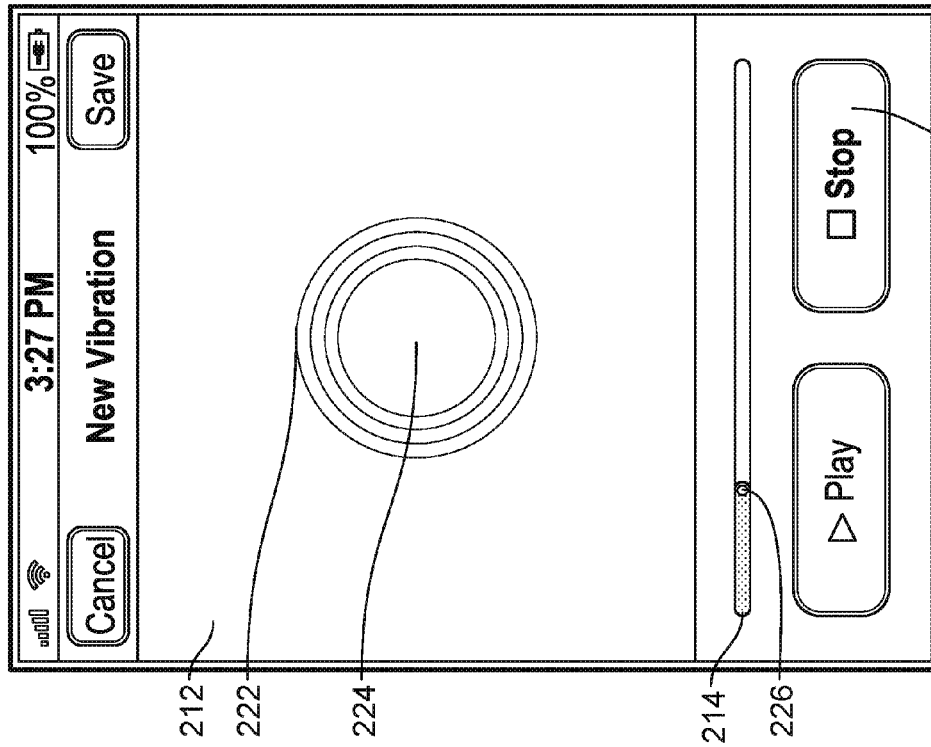
Figure 2A:
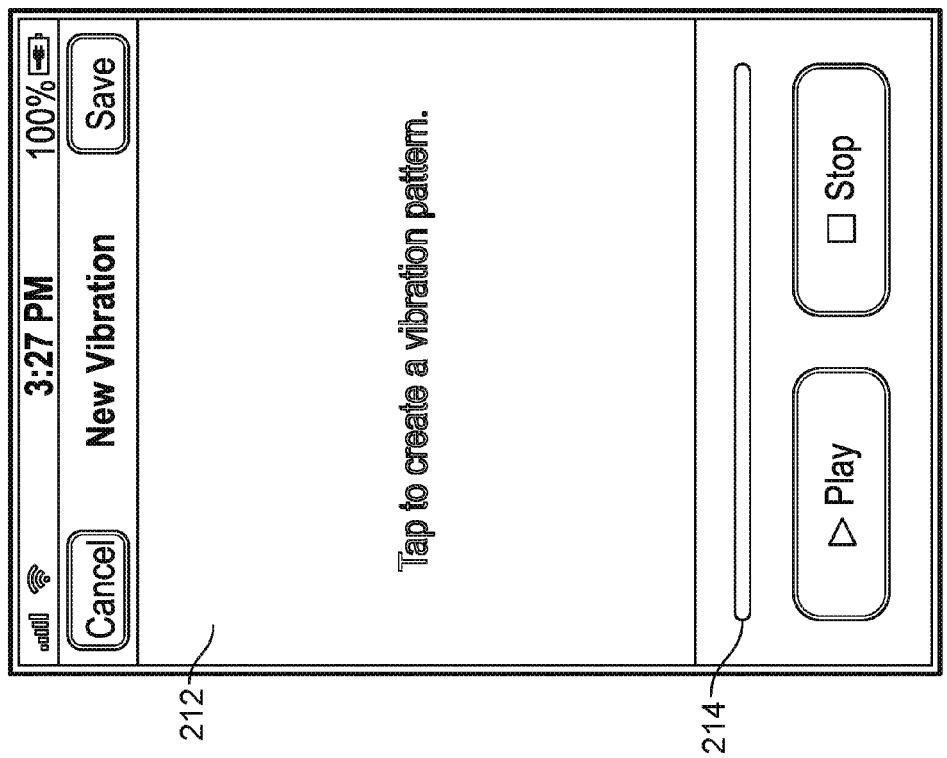

FIGS. 2a-2d are exemplary user interfaces for creating a custom vibration pattern on a mobile device. In FIG. 2a an application running on a mobile device can prompt a user to physically tap display screen 212 of the mobile device to begin a vibration pattern recording phase. Upon detecting a tap, or tap-down event, and beginning the recording phase, the user may physically tap the screen in a series of taps to create vibration segments for a corresponding vibration pattern. Each tap-down event may correspond to an individual vibration segment and vary in duration and intensity. In FIG. 2b, in response to detecting tap-down event 224, the mobile device may provide visual feedback on display 212 and haptic feedback using a haptic mechanism of the mobile device. For example, progress view bar 214 can represent a vibration pattern over time and vibration segment 226 corresponding to tap-down event 224 can be used to indicate a shorter vibration in the vibration pattern. Ripple effect 222 can be presented in display 212 in response to detecting tap-down event 224. In some implementations, ripple effect 222 has the visual effect of emanating from the origin of tap-down event 224 and increases in intensity proportionally to the duration and/or force of tap-down event 224. At any time during the recording of a vibration pattern, a user may select the stop button 228 to end the recording phase.

In FIG. 2c, in response to detecting tap-down event 232, the mobile device may provide visual feedback 230 and 236 as well as haptic feedback. For example, in progress bar 214, vibration segment 236 can correspond to tap-down event 232 and can be depicted by a growing rectangle in progress bar 214 to indicate a longer duration tap-down event. Ripple effect 230 can be displayed in display 212 in response to detecting tap-down event 232 and can correspond to vibration segment 236. For example, ripple effect 230 can have multiple ripples close together to indicate a longer tap-down event or a tap-down event with a stronger intensity. In FIG. 2d, recording of the vibration pattern has ended. For example, a user may select button 228 in FIG. 2c to end a vibration recording phase. An indication of the custom vibration pattern can be seen in progress bar 214 in FIG. 2d. For example, vibration segment 226 can correspond to tap-down event 224 in FIG. 2b, vibration segment 236 can correspond to tap-down event 232 shown in FIG. 2c, and vibration segments 260 and 262 can correspond to other tap-down events that were detected during the recording of the custom vibration pattern. In FIG. 2d, after recording of a vibration pattern has ended, a user may select the play button 240 to replay the previously created vibration pattern or the record button 242 to record a new vibration pattern. Additionally, the user may select save button 250 to assign a name to the vibration pattern and save the vibration pattern to memory.

FIGS. 3a-3b are exemplary user interfaces for replaying a custom vibration pattern on a mobile device. For example, FIGS. 3a-3b can be used to replay the custom vibration pattern created in FIGS. 2a-2d. In FIG. 3a, if a user selects play button 240 in FIG. 2d to replay the previously created vibration pattern, the vibration pattern represented by progress bar 214 can be replayed on the mobile device. Replay of a vibration pattern may involve both haptic and visual feedback. For example, during playback the visualizations and haptic feedback created during the recording of a vibration pattern may be conveyed to a user of the mobile device. As an example, the vibration pattern created in FIGS. 2a-2d can be used in FIGS. 3a-3b. Playback may be indicated by a playback position on progress bar 214. When vibration segment 226 is encountered during playback, visual and haptic feedback can be provided corresponding to vibration segment 226. For example, haptic feedback corresponding to the duration and/or intensity of the tap-down event used to create vibration segment 226 can be actuated and ripple effect 222 displayed during the recording of vibration segment 226 can be presented in display 212. When playback encounters vibration segment 236, haptic feedback corresponding to the duration and/or intensity of the tap-down event used to create vibration segment 236 can be actuated and ripple effect 230 displayed during the recording of vibration segment 236 can be presented in display 212. Similarly, when playback encounters vibration segments 260 and 262, haptic feedback corresponding to the duration and/or intensity of the tap-down events used to create vibration segments 260 and 262 can be actuated and ripple effects displayed during the recording of vibration segments 260 and 262 can be presented in display 212.

Figure 4:
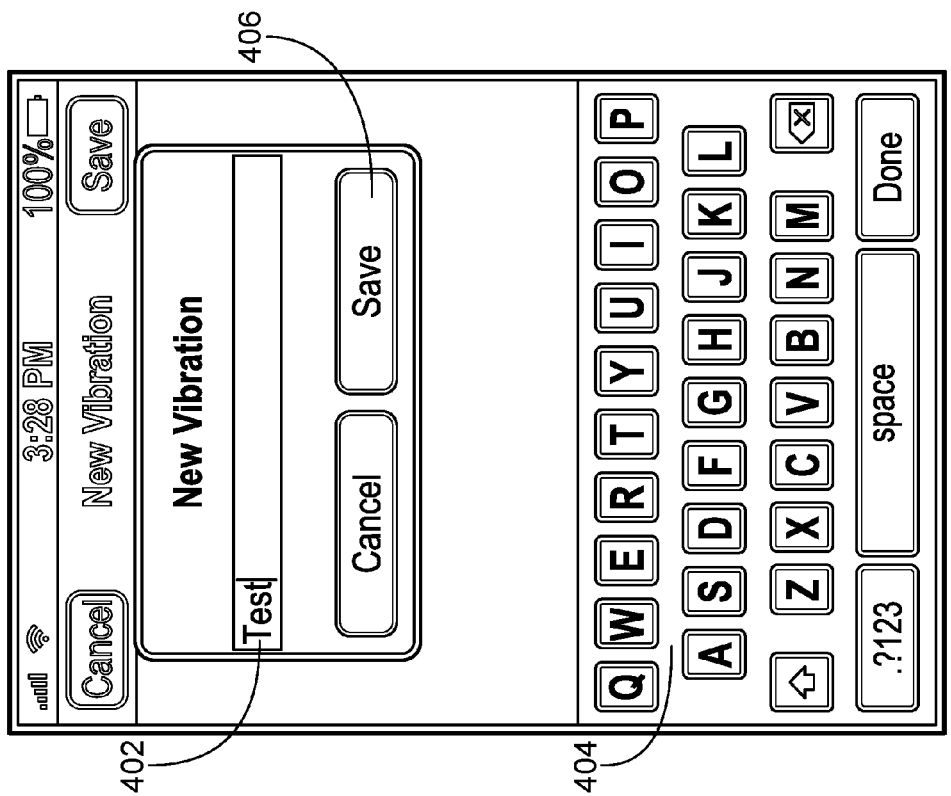
FIG. 4 is an exemplary user interface for naming and storing a custom vibration.

FIG. 4 is an exemplary user interface for naming and saving a custom vibration pattern. For example, a user may enter a name for a custom vibration pattern in text box 402, e.g., "Test", using keyboard 404 and then save the name by clicking save button 406.

Figure 5:
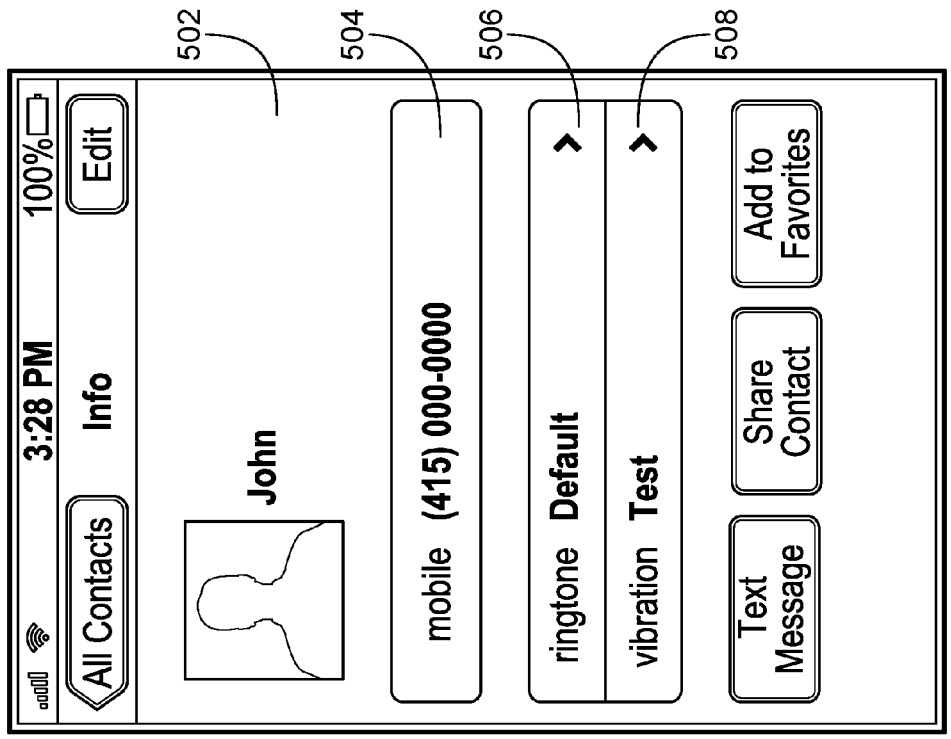
FIG. 5 is an exemplary user interface for assigning a vibration pattern to a notification event.

FIG. 5 is an exemplary user interface for assigning a vibration pattern to a notification event. For example, the custom vibration pattern "Test" may be selected in vibration selection 508 to correspond to the contact "John" in 502. When a mobile device detects that John is calling by detecting the number in mobile number box 504 is calling, the mobile device can actuate haptic feedback in accordance with vibration pattern "Test" and/or play audible sounds in accordance with ringtone "Default" in box 506.

Figure 6:
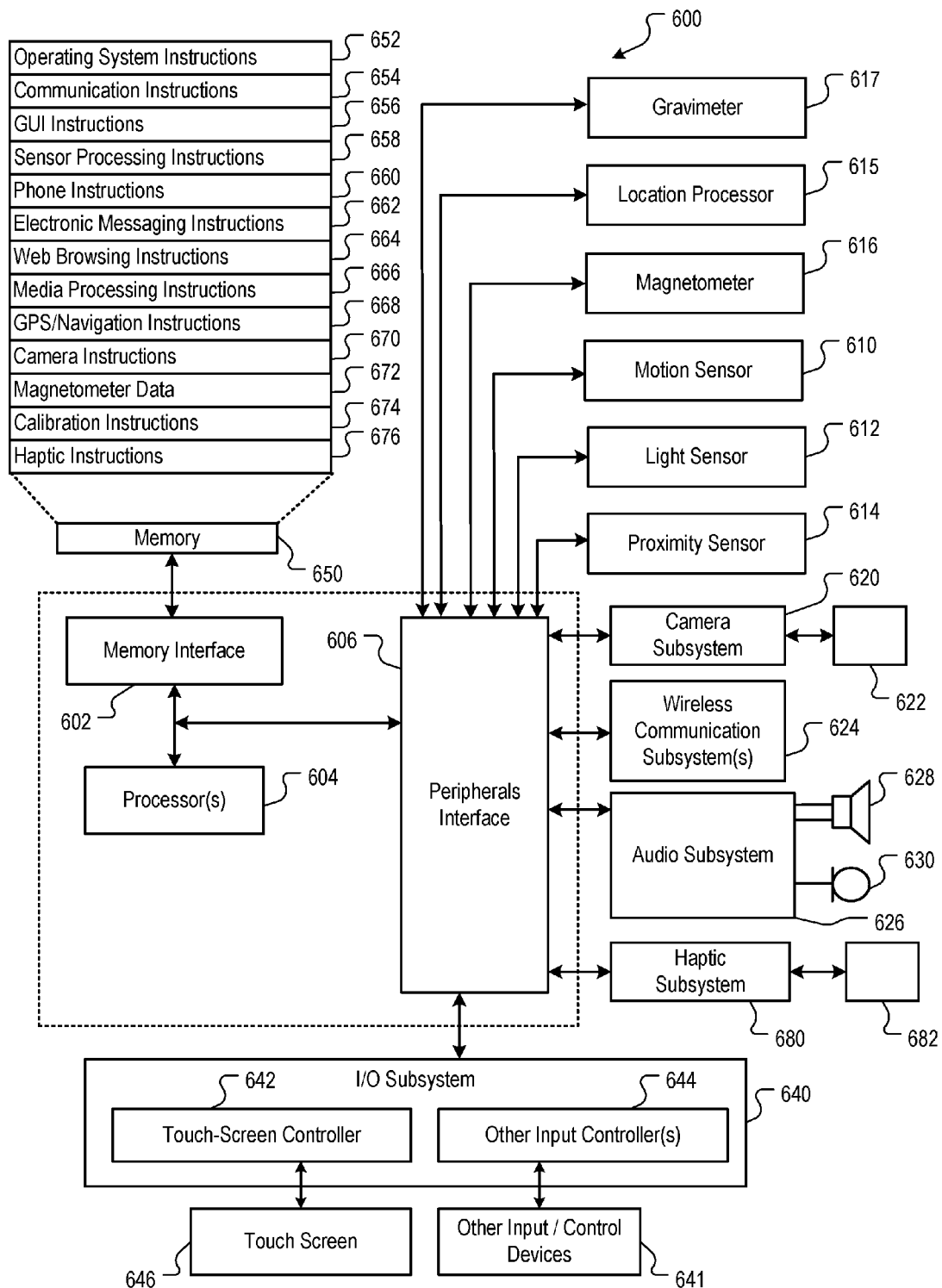
FIG. 6 is a block diagram of exemplary architecture of a mobile device.

FIG. 6 is a block diagram of exemplary architecture 600 of a mobile device configured to perform motion-based operations. A mobile device can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors (APs) and one or more baseband processors (BPs). The application processors and baseband processors can be integrated in one single process chip. The various components in mobile device 600, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Motion sensor 610 can include one or more accelerometers configured to determine change of speed and direction of movement of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Gravimeter 617 can be coupled to peripherals interface 606 to facilitate measurement of a local gravitational field of Earth.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a CDMA system, a WiFi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. In addition, microphone 630 may detect ambient noise and other audible frequencies.

Haptic subsystem 680 and haptic mechanism 682, e.g., spinning motor, servo motor, or piezoelectric motor, can be utilized to facilitate haptic feedback, such as vibration, force, and/or motions.

I/O subsystem 640 can include touch screen controller 642 and/or other input controller(s) 644. Touch-screen controller 642 can be coupled to a touch screen 646 or pad. Touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch screen 646; and a pressing of the button for a second duration that is longer than the first duration may turn power to mobile device 600 on or off. The user may be able to customize a functionality of one or more of the buttons. The touch screen 646 can, for example, also be used to implement virtual or soft buttons and/or a keyboard.

In some implementations, mobile device 600 can present recorded audio and/or video files, such as MP3, AAC, and MPEG files. In some implementations, mobile device 600 can include the functionality of an MP3 player. Mobile device 600 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can include haptic instructions 676. Haptic instructions 676 can be configured to cause the mobile device to perform haptic-based operations, for example providing haptic feedback to a user of the mobile device as described in reference to FIGS. 1-5.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Figure 7:
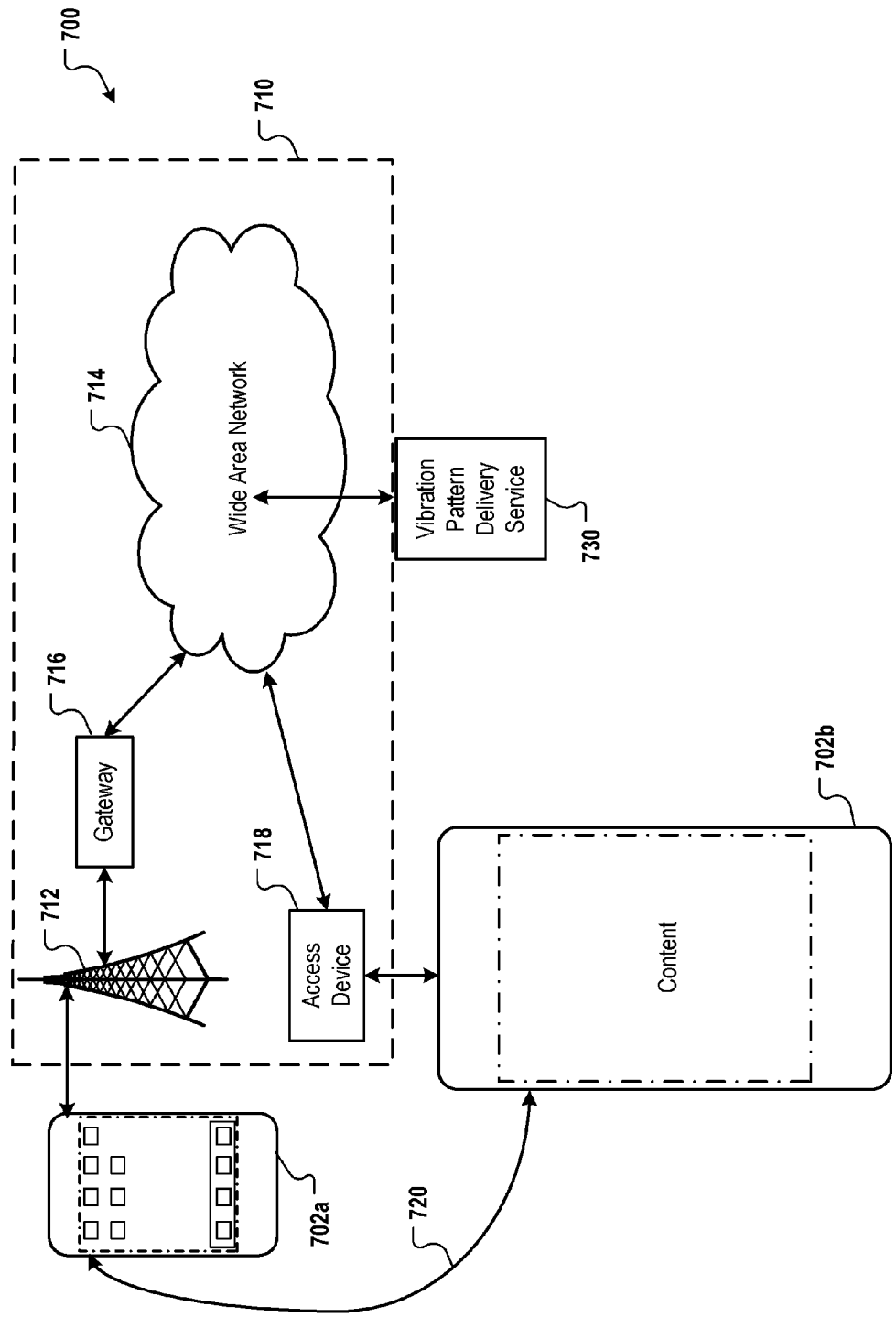
FIG. 7 is a block diagram of an exemplary network operating environment for mobile devices.

FIG. 7 is a block diagram of exemplary network operating environment 700 for the mobile devices configured to perform motion-based operations. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access device, can provide communication access to the wide area network 714.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless mobile device 702a can communicate with other wireless devices, e.g., other mobile devices 702a or 702b, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730 over the one or more wired and/or wireless networks. For example, one or more vibration pattern delivery services 730 can be used to deliver one or more vibration patterns. In some implementations, a vibration pattern delivery service may be a virtual store to buy and download vibration patterns. A vibration pattern delivery service may also be part of a push notification delivery service. For example, a vibration pattern associated with a particular push notification may be pushed to a mobile device to inform a user of the mobile device of the particular notification, e.g., a distinctive vibration pattern may be associated with a team scoring in a sports game, when the team scores, the distinct vibration pattern can be pushed to the mobile device to notify the user of the mobile device of the score.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations have been described. Nevertheless, it will be understood that various modifications may be made. In addition, other steps may be provided, or steps may be eliminated, from the described flows, and other components may be added to, or removed from, the described systems. Accordingly, other implementations are within the scope of the following claims.

What is claimed is:

1. A method performed by one or more processes executing on an electronic device, the method comprising:
    selecting, from preset stock vibration patterns, a geometric representation of a vibration pattern;
    associating feedback with the selected geometric representation of a vibration pattern;
    assigning the associated feedback to a notification event; and signaling, to a user of the electronic device, an alert of the notification event by actuating the feedback associated with the selected geometric representation of a vibration pattern.

2. The method of claim 1, further comprising:
providing to the electronic device, by a vibration pattern delivery service over a wireless network, the preset stock vibration patterns; and
displaying, on the electronic device, the geometric representation of a vibration pattern for each of the preset stock vibration patterns.

3. The method of claim 1, wherein the geometric representation includes a plurality of concentric geometric shapes, each of the plurality of concentric geometric shapes depicting a vibration segment.

4. The method of claim 3, wherein a spacing between adjacent ones of the geometric shapes depicts one of a duration and an intensity of the vibration segment.

5. The method of claim 3, wherein a color associated with each one of the geometric shapes depicts one of a duration and an intensity of the vibration segment.

6. The method of claim 1, wherein the geometric representation includes a progress bar depicting a plurality of vibration segments, in which a length of each of the vibration segments depicts a duration of each of the vibration segments.

7. An electronic device comprising:
a processor configured to execute instructions stored in a machine-readable medium;
an input/output subsystem, operatively coupled to the processor;
a feedback subsystem, operatively coupled to the processor, including a feedback mechanism and configured to provide a user of the electronic device with feedback in response to information received from the processor;
a memory serving as the machine-readable medium and storing processor executable instructions to cause the electronic device to perform operations comprising:
selecting, from preset stock vibration patterns, a geometric representation of a vibration pattern;
associating feedback with the selected geometric representation of a vibration pattern;
assigning the associated feedback to a notification event; and
signaling, to a user of the electronic device, an alert of the notification event by actuating the feedback mechanism and providing the feedback associated with the selected geometric representation of a vibration pattern.

8. The electronic device of claim 7, further comprising:
providing, by a vibration pattern delivery service over a wireless network, the preset stock vibration patterns; and
displaying the geometric representation of a vibration pattern for each of the preset stock vibration patterns.

9. The electronic device of claim 7, wherein the geometric representation includes a plurality of concentric geometric shapes, each of the plurality of concentric geometric shapes depicting a vibration segment.

10. The electronic device of claim 9, wherein a spacing between adjacent ones of the geometric shapes depicts one of a duration and an intensity of the vibration segment.

11. The electronic device of claim 9, wherein a color associated with each one of the geometric shapes depicts one of a duration and an intensity of the vibration segment.

12. The electronic device of claim 7, wherein the geometric representation includes a progress bar depicting a plurality of vibration segments, in which a length of each of the vibration segments depicts a duration of each of the vibration segments.

13. A computer program product, encoded on a non-transitory computer-readable medium, operable to cause a data processing apparatus to perform operations comprising:
selecting, from preset stock vibration patterns, a geometric representation of a vibration pattern;
associating feedback with the selected geometric representation of a vibration pattern;
assigning the associated feedback to a notification event; and
signaling, to a user of the electronic device, an alert of the notification event by actuating the feedback associated with the selected geometric representation of a vibration pattern.

14. The computer program product of claim 13, further comprising operations of:
providing to the electronic device, by a vibration pattern delivery service over a wireless network, the preset stock vibration patterns; and
displaying, on the electronic device, the geometric representation of a vibration pattern for each of the preset stock vibration patterns.

15. The computer program product of claim 13, wherein the geometric representation includes a plurality of concentric geometric shapes, each of the plurality of concentric geometric shapes depicting a vibration segment.

16. The computer program product of claim 15, wherein a spacing between adjacent ones of the geometric shapes depicts one of a duration and an intensity of the vibration segment.

17. The computer program product of claim 15, wherein a color associated with each one of the geometric shapes depicts one of a duration and an intensity of the vibration segment.

18. The computer program product of claim 13, wherein the geometric representation includes a progress bar depicting a plurality of vibration segments, in which a length of each of the vibration segments depicts a duration of each of the vibration segments.

* * * * *